United States Patent [19]

Thompson

[11] E Re. 30,649

[45] Reissued Jun. 16, 1981

[54] FOOD PROCESSING APPARATUS

[75] Inventor: James W. Thompson, Troy, Ohio

[73] Assignee: Hobart Corporation, Troy, Ohio

[21] Appl. No.: 90,822

[22] Filed: Nov. 2, 1979

Related U.S. Patent Documents

Reissue of:

[64] Patent No.: 4,100,615
Issued: Jul. 11, 1978
Appl. No.: 803,462
Filed: Jun. 6, 1977

[51] Int. Cl.[3] ..... B01F 7/16

[52] U.S. Cl. ..... 366/169; 366/185; 366/246; 366/295; 366/309

[58] Field of Search ..... 366/185, 189, 305, 306, 366/309, 312, 313, 293, 295, 296, 314, 245, 247, 246, 169; 241/199.12, 282.1, 37.5, 89.3, 82.2, 97, 282.2, 56

[56] References Cited

U.S. PATENT DOCUMENTS

| | | | |
|---|---|---|---|
| 2,918,956 | 12/1959 | Otto | 241/97 |
| 3,415,497 | 12/1968 | Johnson | 259/122 |
| 3,434,518 | 3/1969 | Motis | 241/199.12 |
| 3,892,365 | 7/1975 | Verdun | 241/199.12 |
| 3,957,215 | 5/1976 | Otto | 241/282.1 |

FOREIGN PATENT DOCUMENTS 536598 7/1973 Switzerland .

*Primary Examiner*—Robert W. Jenkins
*Attorney, Agent, or Firm*—Biebel, French & Nauman

[57] ABSTRACT

The lid support member for the lid of a high speed food processing apparatus supports a mixing baffle blade through the center of the lid. The mixing baffle blade drive shaft is hollow for introducing liquids into the mixing bowl directly over the food processing blades.

4 Claims, 16 Drawing Figures

98
70
104
99
100
20
77
133
37
70
76
34
34
132
134
70
104
100
25
114
26
114
26
25
37
38
23b
39
22

FOOD PROCESSING APPARATUS

Matter enclosed in heavy brackets [ ] appears in the original patent but forms no part of this reissue specification; matter printed in italics indicates the additions made by reissue.

BACKGROUND OF THE INVENTION

This invention relates to high speed food processing machines in which a vertical drive shaft supports and drives food processing blades within an upwardly open food containing bowl. The bowl, which is closed by a lid during food processing, is pivoted for pouring its contents. Typically, a powerful motor on the bottom of the bowl rotates the drive shaft, and a mixing baffle blade is supported through the lid for rotation along and around the inside surface of the bowl for removing and returning foodstuffs from the side of the bowl to the vicinity of the food processing blades for further processing. The blades are removable and interchangeable, so that the blade or other tool configurations may be matched to the processing needs at hand. Machines of this type are highly effective in processing foods, and are so fast (many operations being performed in less than a minute), that the actual processing time is but a small part of the total "turn around" time. That is, it usually takes longer to load and unload the machine than to process the food once it is in the machine.

It is sometimes desirable to introduce ingredients into the bowl while the foodstuffs are being processed. Preferably, these ingredients should be distributed uniformly into the main body of the foodstuffs, and there should be no splashing or throwing of material back out of the bowl. For doing this in prior art devices, they have commonly been stopped, the baffle blade and its drive shaft removed, and then the baffle blade drive shaft hole in the lid is used for this purpose. However, this requires stopping the apparatus, removing a possibly messy baffle blade, and then operating the apparatus without the benefit of the baffle blade while the ingredients are being added.

SUMMARY OF THE INVENTION

Briefly, the present invention overcomes the above prior art difficulties by providing for introducing ingredients as the food is being processed, without having to remove the mixing baffle blade. This is accomplished by providing a hollow drive shaft for the mixing baffle blade. The drive shaft is open at both ends so that it connects through the center of the lid for introducing ingredients into the mixing bowl directly over the food processing blades and drive shaft. The ingredients are then spun from the top of the drive shaft in an essentially uniform pattern across the top of the main body of foodstuffs within the bowl.

It is therefore an object of the present invention to provide an improved apparatus for high speed processing of foodstuffs; an apparatus which includes a hollow mixing baffle blade drive shaft in the center of the lid for introducing liquids into the mixing bowl directly over the food processing blades and drive shaft; and to accomplish the above objects and purposes in a versatile and durable configuration readily suited to processing a wide variety of food products.

Other objects and advantages of the invention will be apparent from the following description, the accompanying drawings and the appended claims.

DESCRIPTION OF THE PREFERRED EMBODIMENT

Figure 1:
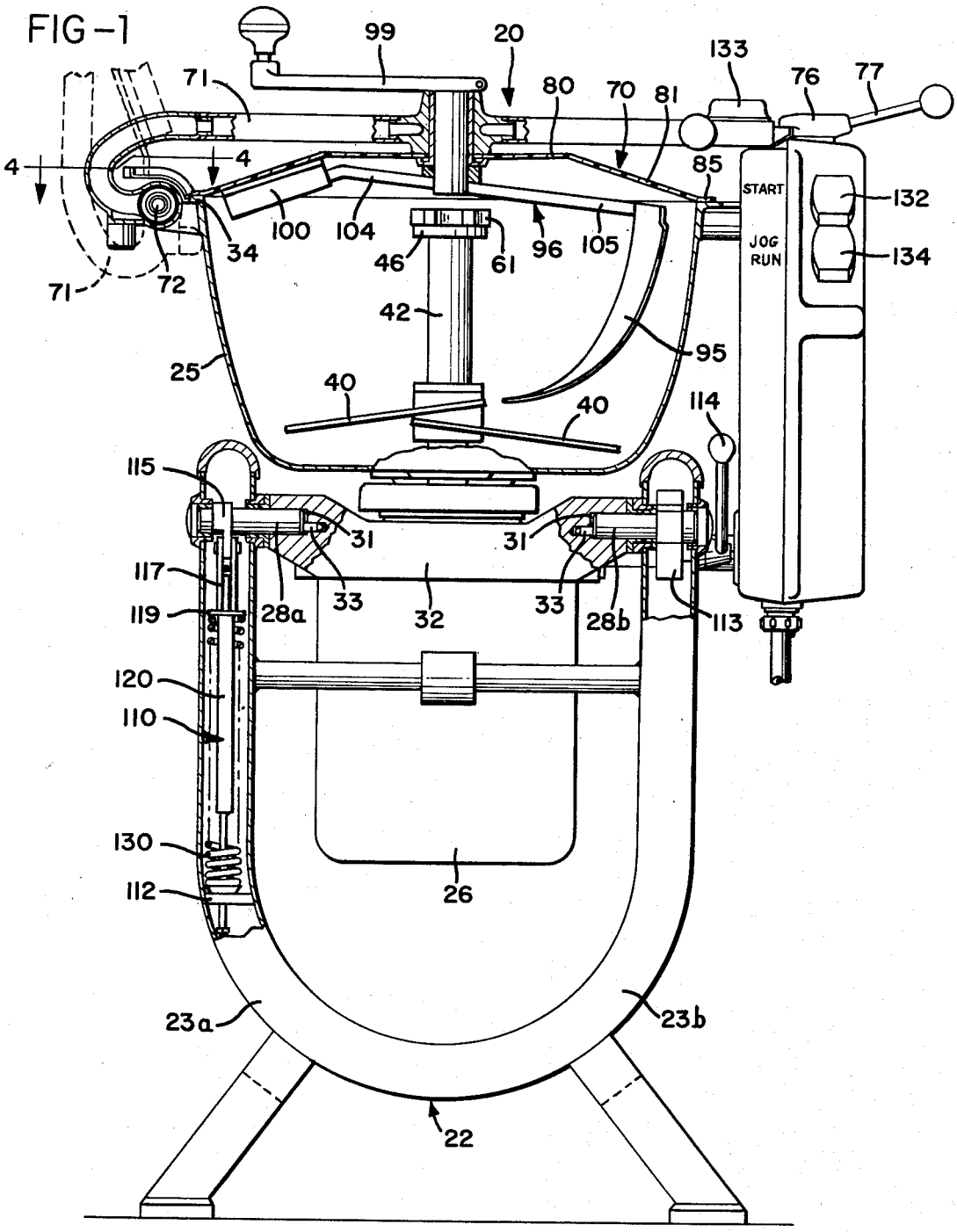
FIG. 1 is a partially sectioned front view of a food processing apparatus incorporating the features of the present invention.

The food processing apparatus 20, illustrated in FIG. 1, includes a stand 22 having hollow, vertically extending arms 23a and 23b. Arms 23a and b support a bowl 25 and drive motor 26 through shafts 28a and 28b which are journaled, respectively, in arms 23a and b. Shafts 28a and b are thus free to pivot and rotate in arms 23a and b, and define a horizontal axis of rotation for the bowl 25 and motor 26. Shafts 28a and b are received in bores 31 in a motor and bowl support brace 32 extending between arms 23a and b. Shafts 28a and b are pinned by pins 33 in brace 32 to cause the shafts and brace to rotate together as a unit.

When in the food processing position, the bowl is upright (as shown in solid lines in FIG. 2) and upwardly open, with its upper edge 34 defining a horizontal plane. Bowl 25 is substantially radially symmetrical, defining a figure of rotation about the vertical center line of the bowl. The drive shaft 35 (FIG. 11) of motor 26 enters bowl 25 through its bottom and is coaxial with the center line of the bowl. As should also be clear from FIG. 2, the horizontal or pouring axis defined by shafts 28a and b is located between the center line of the bowl and the forward or pouring edge of the bowl, on which there is a pouring lip 37. By positioning the horizontal axis forwardly, a greater pouring height is provided than would occur if the axis passed through the center line of the bowl, as in many prior art machines. The greater pouring height provides sufficient clearance for conventional receiving pans such as the pan 38 on the cart 39 illustrated in FIG. 2.

Figure 11:
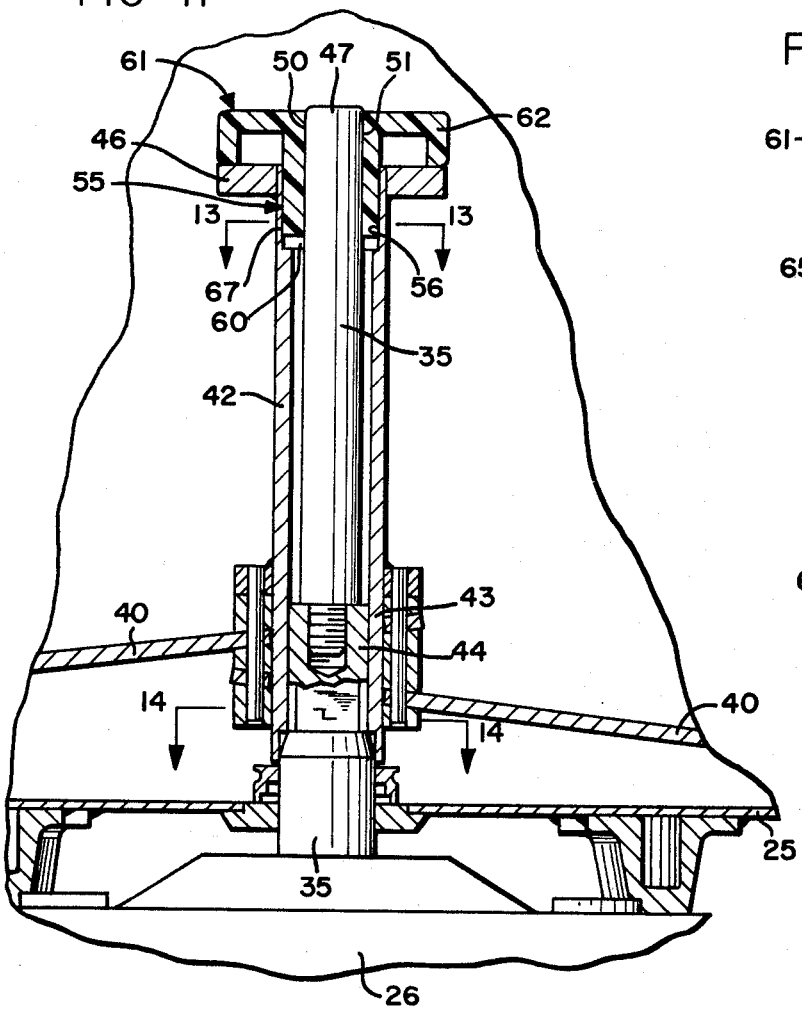
FIG. 11 is a partially sectioned, enlarged fragmentary view showing details of the drive shaft, blade mount, and wedge lock.
Figure 14:
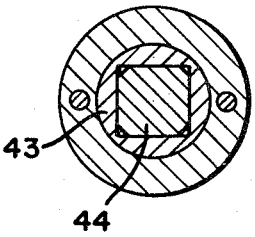
FIG. 14 is a cross sectional view taken on line 14—14 of FIG. 11.

The food (not shown) is processed within bowl 25 by one or more food processing tools, such as blades 40, which are carried on a tool or blade mount 42. Mount 42 is a hollow shaft which fits onto the drive shaft 35 (FIG. 11) and has a hollow square coupling 43 at its base which fits driveably onto a matching square driving portion 44 on the drive shaft 35, at the bottom of the bowl (FIGS. 11 and 14). The coupling between the drive shaft and blade mount transmits the drive torque from the drive shaft to the mount and to the blades 40. Blade mount 42 extends upwardly, terminating at an upper end 46 adjacent the upper end 47 of drive shaft 35. The blade mount is readily removed and replaced by sliding it vertically onto and off the drive shaft, over the upper end 47 thereof.

Figure 12:
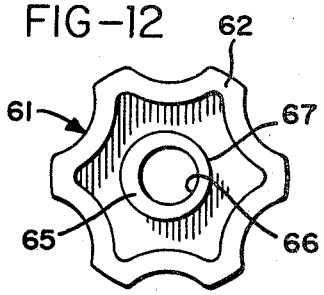
FIG. 12 is a bottom view of the wedge lock cap.
Figure 13:
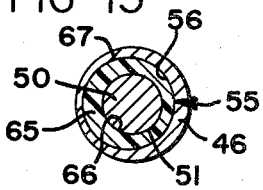
FIG. 13 is a cross sectional view taken on line 13—13 of FIG. 11.

FIGS. 11–13 illustrate details of the manually operable wedge lock for securing and releasing the blade mount 42 and food processing blades 40 on the drive shaft 35. As illustrated, the upper end 47 of drive shaft 35 terminates in a cylindrical boss 50, the axis of which is coincident with the axis of rotation of the drive shaft 35. Boss 50 thus defines a vertically oriented cylindrical surface 51. The upper end 46 of the blade mount 42 is similarly provided with a cylindrical bore 55 having a substantially vertical axis which, however, is not coincident with the axis of rotation of drive shaft 35, and is therefore eccentric with regard to cylindrical boss 50. As a result, the vertically oriented cylindrical surface 56 on the inside of bore 55, which is spaced from surface 51, is eccentric with regard thereto. Further, as illustrated, surface 51 of boss 50 is contained within the cylindrical volume defined by surface 56 of bore 55. The surfaces 51 and 56 are surfaces of rotation, and the space 60 (FIG. 11) between them is a radially eccentric space. Due to the symmetries which are consequent to figures and surfaces of rotation (their axes being vertical), the radially eccentric space 60 is a substantially symmetrical space about a radial bisection line passing through the respective axes of rotation of the surfaces 51 and 56. (This can be seen in FIG. 13, where the top and bottom halves of the figure are symmetrical about a horizontal bisection line).

Surfaces 51 and 56, along with the radially eccentric space 60 which they define, are important parts of the wedge lock by which the blade mount 42 is secured onto the drive shaft 35. The remainder of the wedge lock is carried in a cap 61 having a manually engageable head 62 on its top side and a wedging portion 65 extending from its bottom side. Wedging portion 65 has an inner cylindrical surface 66 of the same dimension as, and complementary to, the cylindrical surface 51 on boss 50, and an outer surface 67 of the same dimension as, and complementary to, that of surface 56 inside the cylindrical bore 55 on the upper end 46 of blade mount 42. Wedging portion 65 is thus dimensioned for reception in, and is substantially complementary to, the radially eccentric space 60 on the upper ends 46 and 47 of mount 42 and drive shaft 35. Therefore, to secure the blade mount 42 on shaft 35 after it is positioned thereon, the operator grips the cap head 62, positions wedging portion 65 opposite space 60, and inserts the wedging portion into space 60. The cap 61 is next rotated sharply either to the left or to the right. This causes surfaces 66 and 67 to interfere with surfaces 51 and 56 as they move relative to one another and as the wedging portion is shifted to force the larger portions thereof into the narrower portions of the eccentric space 60. This wedge interference jams the blade mount coupling 43 and the drive shaft driving portion 44 into tight engagement with one another to secure the mount 42 and blades 40 thereon onto the drive shaft 35.

While boss 50 has been illustrated with its axis coincident with the axis of rotation of drive shaft 35, it should be clear that the axes of boss 50 and cylindrical bore 55 could readily be exchanged, with a similar modification to surfaces 66 and 67 on wedging portion 65. This would still produce an upwardly open, radially eccentric space between the upper ends 46 and 47 of the blade mount 42 and drive shaft 35. Further analysis will make it clear that the wedge lock of this invention does not require surfaces which are directly opposed to (i.e. facing) one another. The upper end 47 of drive shaft 35, for example, could be provided with a bore (which might even be other than cylindrical) and the outside of the upper end 46 of blade mount 42 could be provided with a surface (which likewise need not be cylindrical) which would be eccentric with regard to one another. It is sufficient that the two upper ends 46 and 47 have surfaces which are spaced from one another, eccentric with regard to one another, preferably vertical, one geometrically inside the other, and both engageable by complementary surfaces on the cap 61. When so configured and properly spaced, rotation of the cap will jam the mount and drive shaft together as the eccentricities on the cap surfaces are rotated out of alignment with the eccentric drive shaft and blade mount surfaces. It should also be noted that the blade mount and drive shaft may be jammed together elsewhere than at the bowl bottom. All that is required is a region therebetween which is spaced closely enough that the eccentric surfaces can jam them together when the cap is rotated.

Figure 4:
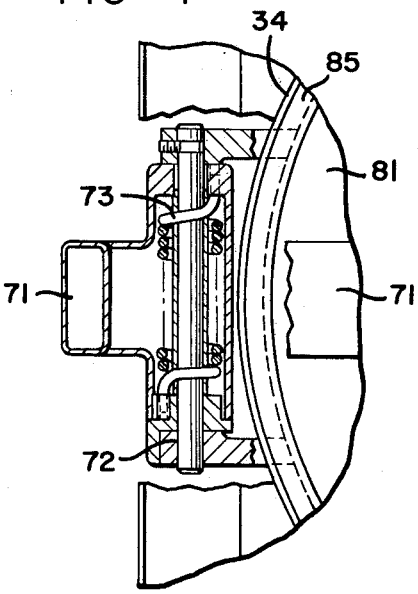
FIG. 4 is a partially sectioned, fragmentary plan view, taken on line 4—4 of FIG. 1, illustrating the pivot and counterbalance for the lid.

The top of apparatus 20 is closed by a cover system which includes a lid 70 supported at its center by a rigid support arm 71 pivoted at 72 to one side of bowl 25. Arm 71 swings on pivot 72 from a lowered, closed position (FIG. 1), to a raised, open position (shown in phantom in FIG. 2). The weight of the lid and arm is counterbalanced by a counterbalance spring 73 (FIG. 4) forming a part of pivot 72, and operating between the arm 71 and bowl 25. The end of arm 71 is latched in the down position by a rotary latch 76 turned by a handle 77 to capture the end of arm 71 thereadjacent. Latch 76 engages arm 71 in a manner which firmly presses arm 71 downwardly against lid 70 to secure and seal the lid against the top edge 34 of bowl 25. For example, in one embodiment latch 76 drives arm 71 3/16 of an inch below the point at which the lid 70 engages the edge 34 of bowl 25.

Lid 70 is preferably made of transparent plastic material so that the machine user can view the contents of the closed bowl without the need to perforate the lid. Perforations weaken the lid structure so that sealing forces are not transmitted uniformly to the perimeter of the lid, and perforations also allow foodstuffs to be splashed out of the bowl.

However, such a lid must also seal effectively over a wide range of working conditions and applications. That is, if the fit between the lid 70 and the bowl edge 34 requires critical adjustment of the latch 76, it will be more expensive to calibrate during manufacture and will require more frequent adjustment in service. To meet these several needs, lid 70 has a configuration which causes it to act like a spring when arm 71 is forced downwardly against it by latch 76. More particularly, the central portion 80 of the lid is formed as a substantially flat disc and serves as a flexible spring-like member (somewhat like a drumhead). The outer portion 81 of the lid surrounds and extends from and beyond the central, flexible portion 80. Portion 81 is a ring which slopes downwardly to define an annular portion of a cone. The geometry of this cone inherently stiffens portion 81 so that it does not flex from the pressure of arm 71, but transmits that force directly to the outer edge of the lid. By making the central portion 80 of the lid smaller, the springiness can be effectively stiffened, and vice versa.

The lid 70 terminates in a rim 85 on the outer edge of the stiff, outer ring 81. Rim 85 is dimensioned for engaging the upper edge 34 of the mixing bowl, and defines a substantially planar annulus which overlies this edge of the bowl when the cover system is closed. Rim 85 is slightly larger than necessary in order to accommodate lateral misregistration between the lid 70 and top 34 of the bowl 25, thus providing additional tolerance. The tolerances are so great, in fact, that no sealing gasket is needed between the lid and the bowl. It should also be noted that the central, flexible disc portion 80 will tolerate a slight twist in the support arm 71 if the arm, for some reason, is not precisely parallel with the plane defined by the top edge 34 of the bowl.

High speed food processing machines of this type usually have a mixing baffle blade such as blade 95. Such blades are supported and mounted through the top of the apparatus for rotation about an axis parallel to the axis of the drive shaft 35. The mixing baffle blade is positioned for rotation along and around the inside surface of the bowl for removing and returning foodstuffs from the side of the bowl to the vicinity of the food processing blades 40. As illustrated, the present invention incorporates such a mixing baffle blade 95, which is supported on a support 96, such as a beam of stainless steel. The support 96 cantilevers blade 95 from a central drive shaft 98 which is supported for rotation in the lid support arm 71 and passes through the central disc portion 80 of the lid to the interior. A handle and crank assembly 99 is attached to the top or outer end of drive shaft 98 for manually rotating the mixing baffle blade 95 during processing of the foodstuffs within the apparatus 20.

Figure 5:
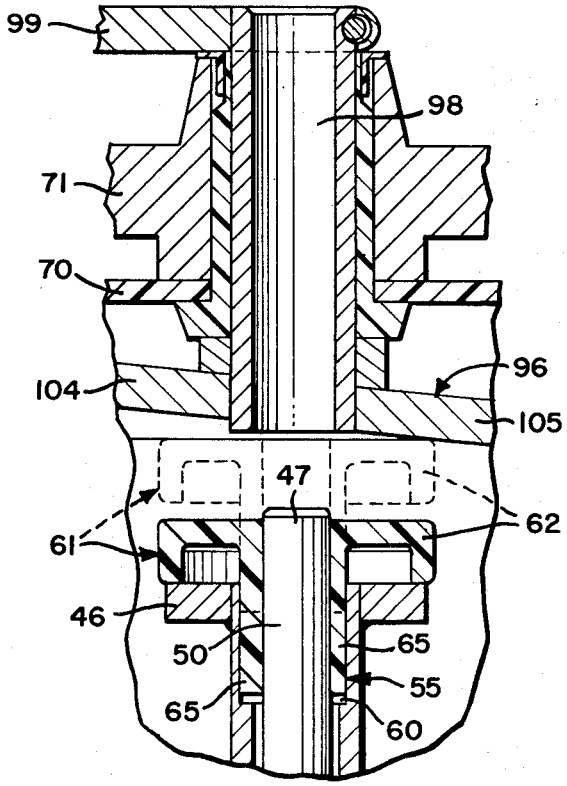
FIG. 5 is a fragmentary cross sectional view, taken on line 5—5 in FIG. 3, showing the hollow mixing baffle blade drive shaft passing through the lid and lid support.

Drive shaft 98 may be hollow, as illustrated in FIG. 5, and open in the top and bottom thereof to provide a passageway through the center of the lid 70 from outside the bowl 25 into the interior thereof. This provides for introducing liquids into the mixing bowl directly over the food processing blades 40 and drive shaft 35 while the motor 26 is being operated. Cap 61 effectively shields the hollow drive shaft 98 from foodstuffs which might otherwise be thrown out. Further, as the liquids are introduced through shaft 98, cap 61 acts as a spinner to fling the liquids outwardly and uniformly across the foodstuffs as they are being processed. It has been found that better and more uniform processing results when liquids are introduced in this manner.

A lid scraper 100 is mounted on an extension portion 104 of the scraper blade support beam 96 for rotation therewith in scraping contact with the inner surface of the lid 70. Lid scraper 100 includes a scraper blade 101 and a gripping body 102. Gripping body 102 is a resilient portion which is dimensioned for fitting onto and frictionally engaging extension portion 104. In the preferred embodiment, extension portion 104 extends in a radially opposite direction from the main portion 105 of the support, the baffle blade 95 being attached to the main portion 105. Then, as the mixing baffle blade 95 is rotated around bowl 25 by the handle and crank assembly 99, the lid scraper blade 101 simultaneously removes and returns foodstuffs from the lid inner surface to the body of foodstuffs within the bowl for better and more uniform processing of the foodstuffs. When processing is concluded, the lid scraper blade 101 removes food products from the lid 70 before it is opened to reduce dripping from the lid. In addition, when the lid is transparent, the scraper clears foodstuffs for easier viewing.

Preferably, the handle and crank assembly 99 and the extension portion 104 of the support 96 extend in radially opposite directions from the main portion 105 of the support on which the mixing baffle blade 95 is suspended. The extension portion 104 and handle and crank assembly 99 are sized and positioned to counterbalance the mixing baffle blade 95 and the main portion 105 of the support 96 to reduce or even eliminate the tendency of the mixing baffle blade 95 to rotate, under the pull of gravity, when the lid is open and the apparatus 20 is tilted for removing the food products. Further, the lid scraper 100 is shaped to be biased against the lid with sufficient frictional force to act as a brake. Thus, the lid scraper 100 also helps to prevent the mixing baffle blade 95 and support 96 from freely rotating under the influence of gravity when its axis of rotation is shifted from the vertical.

Figure 2:
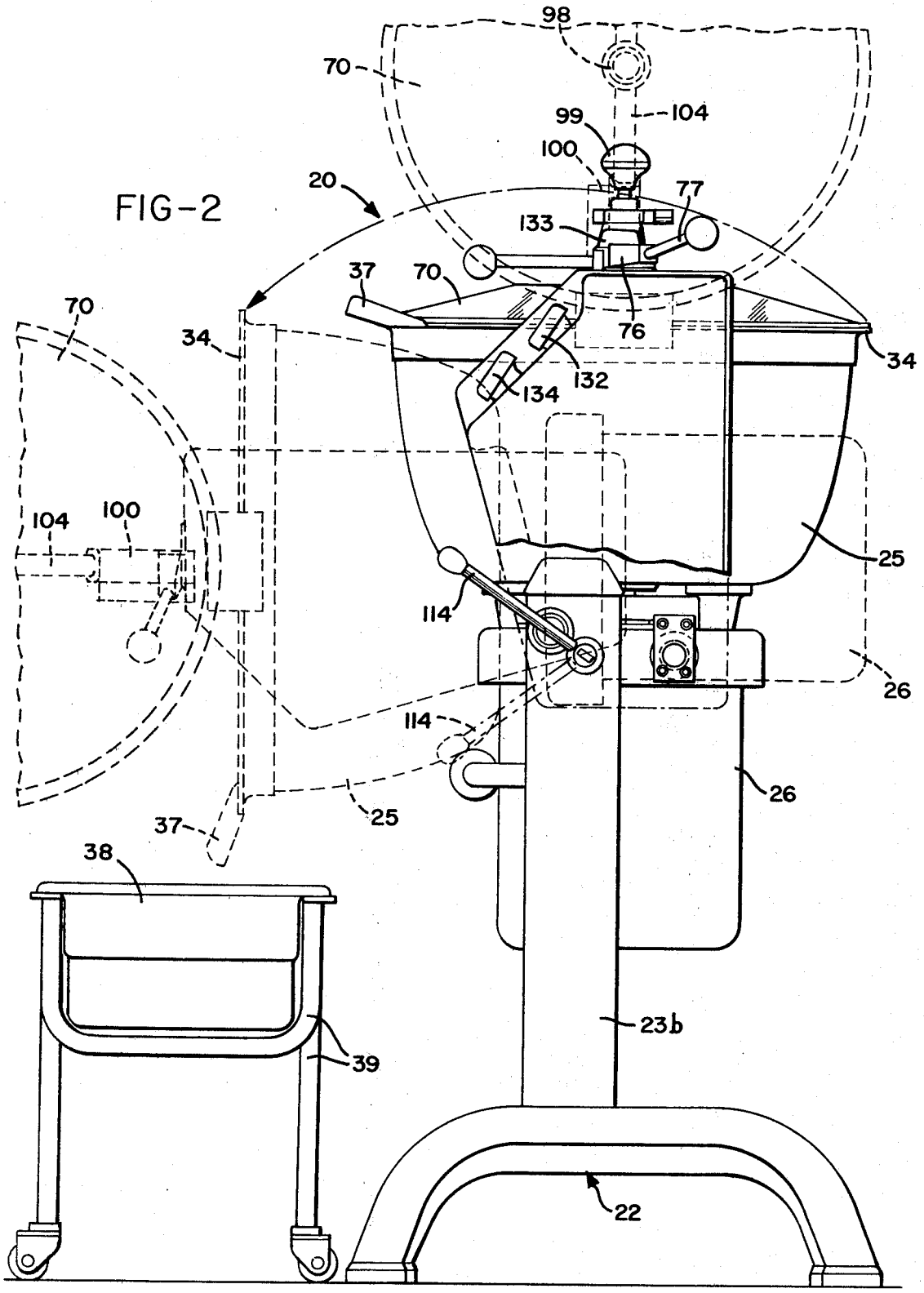
FIG. 2 is a side view of the FIG. 1 apparatus with a food receiving pan and cart next to it, the food processing apparatus being shown in solid lines in its operating position, the raised lid position being shown in phantom, and the pouring position of the apparatus being shown in phantom, illustrating the raised pouring height.
Figure 6:
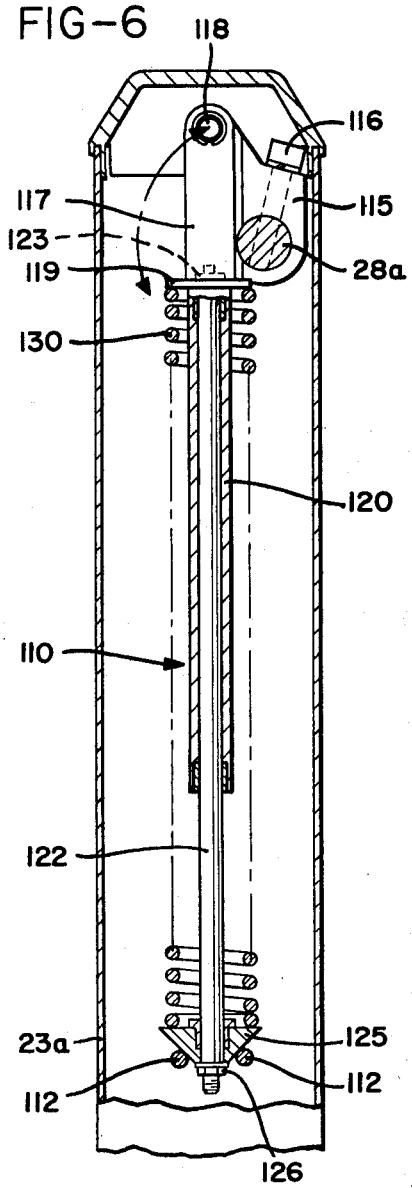
FIG. 6 is a cross sectional view of the stand arm in which the counterbalance spring assembly is located, the view being in the direction looking from left to right in FIG. 1, but illustrating the positions of the parts when the bowl is tilted to the pouring (phantom line) position of FIG. 2.
Figure 7:
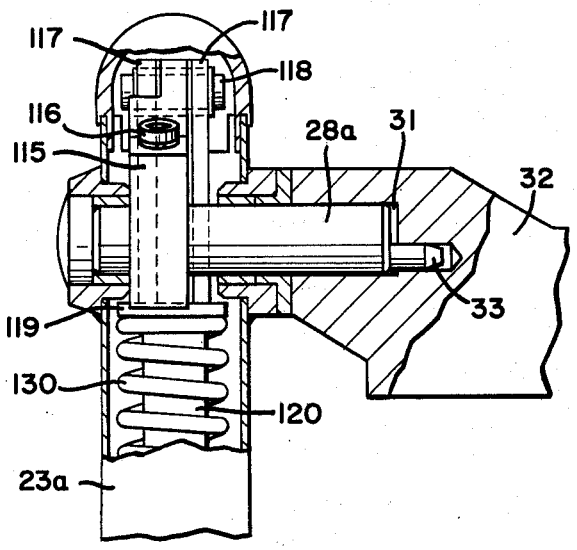
FIG. 7 is an enlarged, fragmentary, partially sectioned showing of a portion of the counterbalance spring assembly as seen in FIG. 6.
Figure 8:
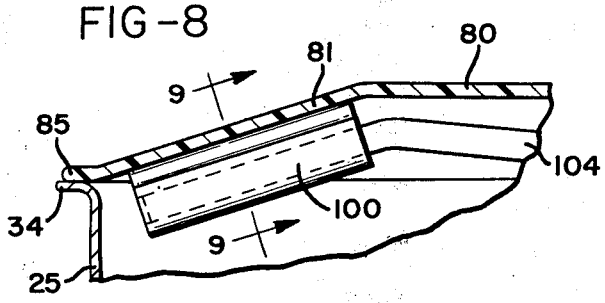
FIG. 8 is an enlarged detail of the lid scraper as seen in FIG. 1.
Figure 9:
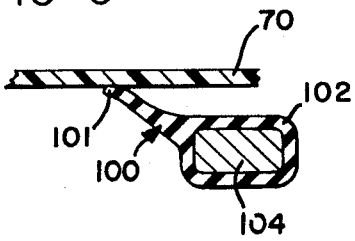
FIG. 9 is a cross sectional view taken on line 9—9 in FIG. 8.
Figure 10:
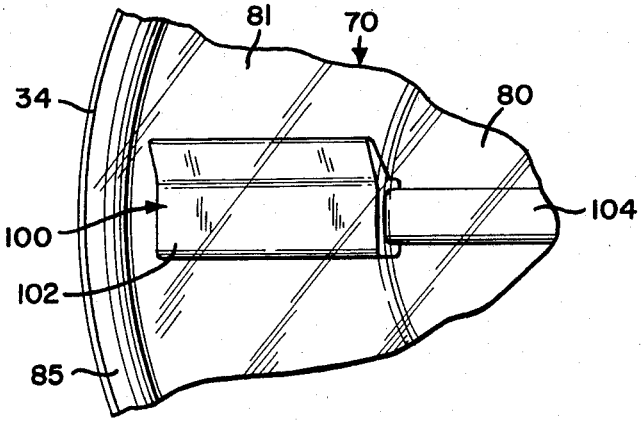
FIG. 10 is a plan view of the lid scraper as seen looking downwardly in FIG. 8.

When the apparatus is tilted, as shown in phantom in FIG. 2, to remove ingredients from the bowl 25, the weight of the motor 26 resists tilting of the bowl. The motor is therefore counterbalanced for easier pouring and better control of the foodstuffs when the bowl is tilted. Such a counterbalance is contained and enclosed in arm 23a so that it is protected from exposure to foodstuffs outside the machine, and vice versa, for purposes of sanitation. The counterbalance spring assembly 110 is attached to pivot shaft 28a at the upper end of arm 23a and operates against a stop 112 farther down in arm 23a. As may be seen in FIG. 6 (which shows the spring assembly when the bowl has been fully tilted), the counterbalance spring assembly 110 is thus operative between arm 23a and shaft 28a to help rotate the shaft in a clockwise direction (as shown in FIG. 6) to counterbalance the motor 26 during tilting. Control of bowl 25 during tilting and pouring is also aided by a brake 113 in arm 23b. Brake 113 is operated by a brake handle 114 to control rotation of shaft 28b, and hence bowl 25, relative to arm 23b.

Counterbalance spring assembly 110 includes a crank 115 which is fixed to shaft 28a by a bolt 116. A yoke 117 is pivoted at 118 to crank 115 on the end of the crank opposite shaft 28a. Yoke 117 carries a collar 119 on the end of the yoke opposite crank 115 and pivot 118, and a tube 120 is fixed to and extends from the yoke and collar in a downward direction away from pivot 118. A guide rod 122 is received in tube 120 and is free to slide upwardly and downwardly through the tube and the collar 119, but is not permitted to slide downwardly out of the tube, due to a stop nut 123 which is threaded onto the top end of rod 122 above collar 119. In other words, nut 123 establishes a lower limit of travel for rod 122.

The lower end of rod 112 opposite collar 119 passes through a pad 125. A stop nut 126 threaded on the bottom of guide rod 122 below pad 125 establishes a lower limit of movement for pad 125 on rod 122, or conversely, nut 126 establishes an upper limit of travel for guide rod 122 through pad 125. Otherwise, rod 122 and pad 125 are free to slide relative to one another.

Finally a spring 130 is mounted on guide rod 122 in compression between collar 119 and pad 125, so that spring 130 normally spreads the pad 125 and collar 119 until they reach stop nuts 123 and 126. Nuts 123 and 126 and rod 122 then maintain the spring 130 in compression.

When in operative position within arm 23a, pad 125 rests on stop 112, which is illustrated as two rods or pins (FIGS. 1 and 6) passing through arm 23a and nesting pad 125 therebetween. As illustrated by the arrows in FIG. 6, crank 115 is positioned to move yoke 117 and collar 119 away from pad 125 when the bowl 25 is rotated from its upright, food processing position to its tilted, pouring position, and vice versa. As the bowl is returned to its upright position from the fully tilted position in FIG. 6, collar 119 approaches pad 125, the tension on rod 122 is relieved, spring 130 is further compressed, and the pressure of spring 130 operates between stop 112 (through pad 125) and shaft 28a (through collar 119, yoke 117, and crank 115). The reduction of the distance between collar 119 and pad 125 frees rod 122 to move therebetween, within the limits set by nuts 123 and 126. Pad 125 guides rod 122 so that the rod will keep the spring 130 thereon. Pad 125 also guides rod 122 as it slides downwardly under the pull of gravity. The counterbalance spring assembly 110 is thus compact, can be wholly contained within arm 23a, can be easily inserted into the arm, and can be pretensioned (due to rod 122).

Figure 3:
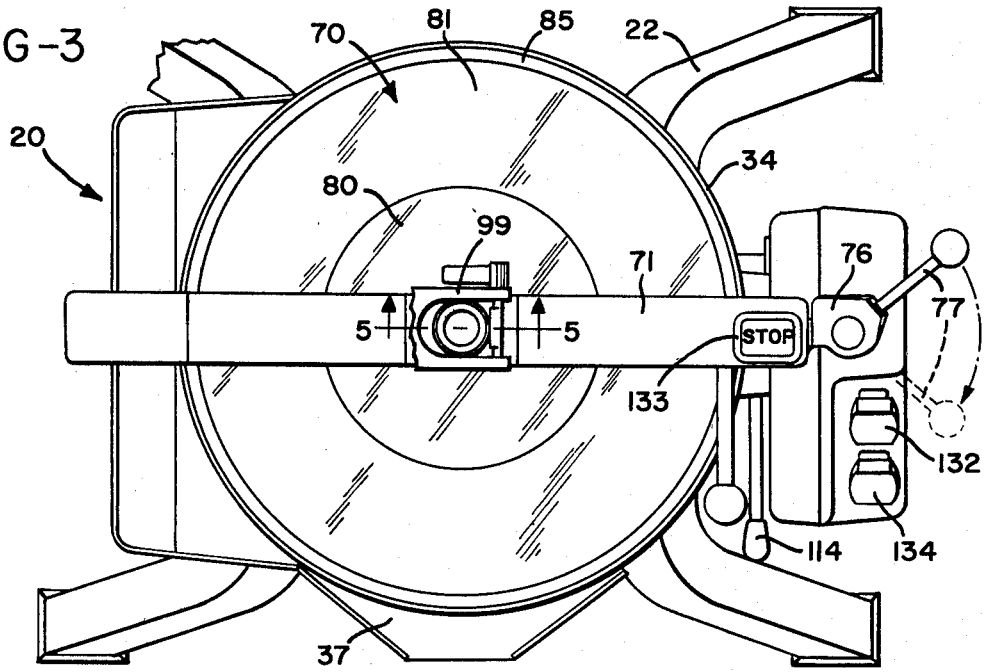
FIG. 3 is a plan view of the apparatus.

A start switch 132 and stop switch 133 (FIG. 3) start and stop the apparatus 20. A mode switch 134 controls whether the operation is continuous (when switch 134 is in the "run" position) or intermittent (when in the "jog" position). When switch 134 is in the "jog" position, machine 20 stops as soon as start switch 132 is released. In addition to stop switch 133, the apparatus may be stopped by releasing latch 71, by tilting the bowl, or by placing switch 134 in the "jog" position.

Figure 15:
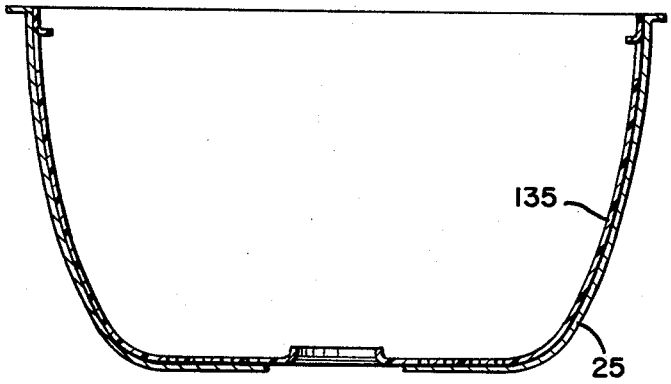
FIG. 15 is a cross sectional view of a food basket located within the bowl.
Figure 16:
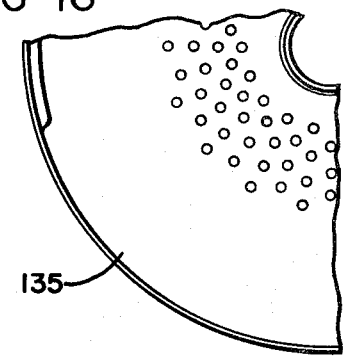
FIG. 16 is a fragmenatary plan view of the FIG. 13 basket.

FIGS. 15 and 16 illustrate an optional food basket 135 which can be inserted into bowl 25 for quickly and easily processing foodstuffs within the basket 135. Prior art food baskets, however, have been made of metal, presumably to provide sufficient strength to preserve the shape of the basket. However, metals are ductile, and once bent or dented, are difficult to restore to their original shape. This is especially troublesome where clearances are close, as here. The present invention, therefore, uses baskets 135 which are made of flexible, non-ductile, plastic material. While the baskets are not sufficiently rigid to retain their shapes, they are particularly resistant to permanent denting, bending, or stretching. Each basket is then formed so that its exterior surface conforms closely to the interior surface of the bowl. Since the basket fits the bowl interior very closely, the rigid bowl will support the basket structurally and restore the basket to its proper bowl matching shape. In the present invention, therefore, it is recognized that the food basket 135 does not have to be able to hold itself in proper shape, and can be much more resistant to abuse, if it is sized for cooperative interaction with the bowl 25.

As may be seen, therefore, the present invention provides numerous advantages. The lid is so structured and supported that transparent materials may be used for better and easier viewing of the contents of the food apparatus, yet wide tolerances are provided. The mixing baffle blade is counterbalanced and carries a lid scraper for removing foodstuffs from the inner surface of the lid to improve the uniformity of the food processing, reduce the tendency of the lid to drop when opened, and provide for viewing the contents when the lid is transparent. The lid scraper also acts as a brake to reduce the likelihood that the mixing baffle blade will move when the lid is opened. Pouring or removing the processed foodstuffs from the apparatus is facilitated through a higher pouring height and a wholly contained counterbalance system. Insertion and removal of the food processing blades is a simple, quick operation involving but a short twist of the cap 61 in either direction to lock or unlock the mixing blades on the drive shaft. Ingredients can be added during processing through the hollow mixing baffle blade drive shaft, and the ingredients are uniformly distributed and processed without splash back of ingredients. If the foodstuffs are to be supported in a separate food basket, a flexible, non-ductile basket can be used to reduce the likelihood of damage from bending or denting of the basket.

While the form of apparatus herein described constitutes a preferred embodiment of this invention, it is to be understood that the invention is not limited to this precise form of apparatus, and that changes may be made therein without departing from the scope of the invention.

What is claimed is:

1. In an apparatus for processing foodstuffs, including a mixing bowl having a drive shaft extending into the bowl through the bottom center thereof, a motor mounted outside the bowl and connected to rotate the drive shaft, food processing blades mountable on the drive shaft within the bowl for processing foodstuffs therein when the motor is operated, a cover system including a lid for closing the top of the bowl, and a mixing baffle blade and support mounted through the center of the lid for rotation along and around the inside surface of the bowl for removing and returning foodstuffs from the side of the bowl to the vicinity of the food processing blades for further processing thereby, the improvement comprising means defining a hollow drive shaft for said mixing baffle blade and support connecting through the center of the lid and being open in the top and bottom thereof for introducing liquids into the mixing bowl directly over the food processing blades and drive shaft while the motor is being operated.

*2. The combination of claim 1 further comprising a cap on the top of the drive shaft beneath said hollow drive shaft.*

*3. The combination of claim 2 wherein said cap has a diameter greater than that of said open bottom of said hollow drive shaft for spinning and flinging the liquids across the top of the main body of foodstuffs within the bowl when introduced through said hollow drive shaft.*

*4. The combination of claim 2 or 3 further comprising means positioning said cap on the drive shaft sufficiently close to said hollow drive shaft to prevent splash back of ingredients therethrough and to shield said hollow drive shaft from foodstuffs which might otherwise be thrown out.*

* * * * *